(12) United States Patent
Washida (10) Patent No.: US 8,570,618 B2
(45) Date of Patent: Oct. 29, 2013

(54) IMAGE SCANNING APPARATUS

(75) Inventor: Satoshi Washida, Kyoto (JP)

(73) Assignee: Murata Machinery, Ltd., Kyoto (JP)

(*) Notice: Subject to any disclaimer, the term of this patent is extended or adjusted under 35 U.S.C. 154(b) by 125 days.

(21) Appl. No.: 13/316,594

(22) Filed: Dec. 12, 2011

(65) Prior Publication Data

US 2012/0176653 A1 Jul. 12, 2012

(30) Foreign Application Priority Data

Jan. 12, 2011 (JP) ................................. 2011-004241

(51) Int. Cl.
*H04N 1/04* (2006.01)
(52) U.S. Cl.
USPC ............................ 358/474; 358/475; 358/497
(58) Field of Classification Search
USPC .......................... 358/474, 497, 496, 498, 475
See application file for complete search history.

(56) References Cited

U.S. PATENT DOCUMENTS

| | | | |
|---|---|---|---|
| 4,870,502 A * | 9/1989 | Dreinhoff et al. | 358/474 |
| 5,672,019 A * | 9/1997 | Hiramatsu et al. | 400/624 |
| 6,102,506 A * | 8/2000 | Sasai et al. | 347/3 |
| 7,167,248 B2 * | 1/2007 | Kato | 356/446 |
| 2004/0017459 A1 * | 1/2004 | Kawaguchi et al. | 347/104 |
| 2007/0252875 A1 * | 11/2007 | Samoto et al. | 347/85 |

FOREIGN PATENT DOCUMENTS

JP  2008-032942 A  2/2008

* cited by examiner

*Primary Examiner* — Negussie Worku
(74) *Attorney, Agent, or Firm* — Keating & Bennett, LLP (57) ABSTRACT

In an image scanning apparatus, a carriage includes a slide block arranged to be guided by a guide rail, and a carriage main body arranged to be mounted onto the slide block. The slide block is mounted on the guide rail in either a standard position or an adjusting position. When the slide block being is in the standard position, the carriage main body is positioned relative to the slide block. When the slide block is in the adjusting position, the angle of the carriage main body can be adjusted relative to the guide rail by swinging the carriage main body relative to the slide block upon a fulcrum pin.

7 Claims, 10 Drawing Sheets

IMAGE SCANNING APPARATUS

CROSS-REFERENCE TO RELATED APPLICATIONS

This application claims priority under 35 U.S.C. 119 to Japanese Patent Application No. 2011-004241 filed on Jan. 12, 2011, which application is hereby incorporated by reference in its entirety.

BACKGROUND OF THE INVENTION

1. Field of the Invention

The present invention relates to an image scanning apparatus for use in, for example, copiers, scanners, facsimile machines and other suitable apparatuses, and more specifically, relates to improvement of a structure to adjust skew of a scanning unit.

2. Description of the Related Art

A variety of means for improving an adjusting structure have conventionally been proposed to resolve the skew of a scanning unit. For example, in an image scanning apparatus disclosed in Japanese Unexamined Patent Publication No. 2008-32942, adjustment clearance is formed between a guiding rod which guides a carriage in a vertical scanning direction and a rod-through hole provided at an attaching portion for the carriage, so that the adjustment clearance is used to conduct the skew correction. More specifically, a scanning unit is slanted in such a way that the scanning unit obliquely intersects with the vertical scanning direction when the scanning unit is not operating. When the scanning unit starts moving in the vertical scanning direction, the whole of the scanning unit is swung along the clearance formed for the skew adjustment in the direction opposite to the moving direction. In this way, displacing the whole scanning unit along the clearance formed for the skew correction can align a scanning line of an image sensor with the standard line.

In order to prevent a scanning line from being misaligned in processes for assembling an image scanning apparatus, the angle of mounting a guide rail on a platen has been adjusted using a jig, or the mounting state of a scanning unit on a guide rail has been adjusted using a jig. In this way, the position adjustment for a guide rail or a scanning unit in the assembling processes can, inmost cases, prevent deviation of a scanning line when the assembling is completed.

The skew correction structure described in the Japanese Unexamined Patent Publication No. 2008-32942 allows a scanning line of an image sensor to align with the standard line by intentionally displacing the whole scanning unit along the adjustment clearance, when the scanning unit moves in the vertical scanning direction. To this end, the rod-through hole of the attaching portion provided on the carriage needs to be formed with great accuracy and consequently costs a lot. Further, in a case where deviation of a scanning line occurs in a test scanning after an image scanning apparatus is assembled, a scanning unit needs to be separated from a guiding rod, a dry bearing provided on the rod-through hole needs to be adjusted and then the scanning unit needs to be reassembled. Consequently, a great deal of time and effort is required for the series of the adjustments required.

In this regard, with respect to an image scanning apparatus for which the angle of mounting a rail can be adjusted using a jig in an assembling process or an image scanning apparatus for which the mounting state of a scanning unit is adjusted in an assembling process, deviation of a scanning line can in most cases be corrected when the assembling is completed. However, as all such image scanning apparatuses need to be adjusted using a jig, a lot of time and effort is required to carry out the adjusting operations. Further, since a scanning line could be deviated by causes other than the mounting angle of a rail or the mounting position of a scanning unit, not all deviations of a scanning line can be avoided, requiring a structure that conducts some kind of correction.

Incidentally, deviation of an image scanning line occurring in an assembling process of an image scanning apparatus is in most cases within an acceptable error range, with few cases where the deviation of a scanning line is not within the acceptable error range. However, even if deviation of a scanning line hardly occurs, the deviation must be corrected. Consequentially, a structure capable of easily adjusting skew has been required.

SUMMARY OF THE INVENTION

Preferred embodiments of the present invention provide an image scanning apparatus that easily and accurately performs skew correction when deviation of a scanning line occurs in a test scanning and consequently saves time and effort in the assembling process to reduce manufacturing costs.

Preferred embodiments of the present invention also provide an image scanning apparatus in which skew correction is simply conducted in less time and with less effort since skew correction can be carried out with a scanning unit being mounted on a guide rail.

According to a preferred embodiment of the present invention, an image scanning apparatus includes a platen, a scanning unit arranged to scan an original document, a guide rail arranged to support the scanning unit movably along the vertical scanning direction, and a driving structure arranged to move the scanning unit along the guide rail. The scanning unit includes an image sensor and a carriage arranged to support the image sensor. The carriage includes a slide block arranged to be guided by the guide rail, and a carriage main body arranged to be mounted onto the slide block. An angle adjustment mechanism is provided between the slide block and the carriage main body so as to adjust the angle of the carriage main body relative to the guide rail.

The angle adjustment mechanism is provided on either of the slide block or the carriage main body, and includes a fulcrum pin arranged to rotatably support the carriage main body, and a fastening structure arranged to fix the carriage main body to the slide block at any angle around the fulcrum pin. The slide block is mounted on the guide rail in either a standard position or an adjusting position in which the slide block is inverted by 180 degrees from the standard position. When the slide block is in the standard position, the carriage main body is positioned on the slide block with a positioning structure provided between the slide block and the carriage main body. When the slide block is in the adjusting position, the angle of the carriage main body can be adjusted by swinging the carriage main body upon the fulcrum pin relative to the slide block 23.

On either of the slide block or the carriage main body, only one fulcrum pin is preferably provided.

The fulcrum pin and a positioning pin are provided on one of the slide block or the carriage main body. Further, on the other of the slide block or the carriage main body, a fulcrum hole corresponding to the fulcrum pin and two positioning holes, and an adjusting hole corresponding to the positioning pin are provided. The fulcrum pin and the positioning pin are arranged such that the fastening structure is located therebetween. When the slide block is in the standard position, the carriage main body is positioned by fitting the positioning pin and the fulcrum pin into the positioning holes. When the slide block is in the adjusting position, the angle of the carriage main body can be adjusted within a range of the adjusting hole by fitting the fulcrum pin into the fulcrum hole and inserting the positioning pin into the adjusting hole.

The fulcrum pin, the first and the second positioning pins are provided on one of the slide block or the carriage main body. On the other of the slide block or the carriage main body, a fulcrum hole corresponding to the fulcrum pin and two positioning holes, and two adjusting holes corresponding to each of positioning pins are provided. The fulcrum pin and the first positioning pin are provided on the one of the sides with the fastening structure located therebetween, and on the other one of the sides, the second positioning pin is provided. When the slide block is in the standard position, the carriage main body can be positioned by fitting each one of the positioning pins into each one of the positioning holes. When the slide block is in the adjusting position, the angle of the carriage main body can be adjusted within a range of the adjusting holes by fitting the fulcrum pin into the fulcrum hole and also by inserting the positioning pins into the adjusting holes.

Among the fulcrum pin and the positioning pins, the fulcrum pin is positioned at a location that is farthest away from the fastening structure.

The fulcrum pin can be formed integrally with the slide block. The positioning pins can also be formed integrally with the slide block.

In a preferred embodiment of the present invention, the carriage includes a slide block arranged to be guided by a guide rail, and a carriage main body arranged to support an image sensor. Further, between the slide block and the carriage main body, an angle adjustment mechanism is provided so as to adjust the angle of the carriage main body relative to the guide rail. Accordingly, in a preferred embodiment of the present invention, when deviation of a scanning line of the image sensor is detected in a test scanning, skew correction can be easily conducted by displacing the carriage main body relative to the slide block. The simple and easy skew correction after an image scanning apparatus is assembled can also reduce manufacturing costs of the image scanning apparatus. In addition, deviation of the scanning line of the image sensor can be resolved by just simply displacing the carriage main body with the scanning unit even being placed on the guide rail.

The angle adjustment mechanism preferably includes the fulcrum pin arranged to rotatably support the carriage main body relative to the slide block, and the fastening structure arranged to fix the carriage main body onto the slide block with any angle around the fulcrum pin. According to this configuration, skew correction can be conducted by just simply swinging the carriage main body upon the fulcrum pin relative to the slide block.

The slide block is installed in the standard position in which the carriage main body is positioned with the positioning structure, or installed in the adjusting position in which the carriage main body can be rotated upon the fulcrum pin. Supposing that the slide block can take only the adjusting position, all of the image scanning apparatuses require adjustment of the angle of mounting the carriage main body after the slide block is mounted onto the carriage main body when image scanning apparatuses are assembled in a factory. On the other hand, if the slide block can take on not only the adjusting position but also the standard position as in various preferred embodiments of the present invention, the slide block is firstly mounted onto the carriage main body in the standard position to complete assembling of an image scanning apparatus. Only when deviation of a scanning line is detected in a test scanning of an original document after the image scanning apparatus is assembled, the angle of the carriage main body is adjusted by changing the position of the slide block to the adjusting position. In other words, in preferred embodiments of the present invention, the angle of the carriage main body is adjusted only when deviation of a scanning line is detected after the image scanning apparatus is assembled. When the slide block is in an initial state, that is, in the standard position, deviation of a scanning line lies in most cases within an acceptable error range, leaving few cases where the deviation does not lie within the acceptable error range. As described above, the preferred embodiments of the present invention significantly shorten the time required for the adjustment and thus reduce the manufacturing costs of the image scanning apparatus, compared with conventional configurations, all of which require an adjustment operation for a mounting angle in all image scanning apparatuses.

Also, providing only one fulcrum pin can simplify the angle adjustment mechanism to reduce costs compared with a case where a plurality of fulcrum pins are provided such that a pin used as fulcrum point is selectively used for the adjustment.

When the slide block is in the standard position, the carriage main body is positioned by fitting the positioning pin and the fulcrum pin into the positioning holes. Alternatively, the carriage main body is positioned by fitting the first and the second positioning pins into the positioning holes. When the slide block is in the adjusting position, the angle of the carriage main body can be adjusted within a range of the adjusting holes by fitting the fulcrum pin into the fulcrum hole and also inserting the positioning pins into the adjusting holes. According to a preferred embodiment of the present invention, by inserting the fulcrum pins, which are provided on one of the slide block or the carriage main body into the holes which are provided on the other of the slide block or the carriage main body, the slide block and the carriage main body are attached to each other. Accordingly, the slide block can be easily separated from the carriage main body to change the slide block easily from the standard position to the adjusting position.

Among the fulcrum pin and the positioning pins, the fulcrum pin is provided at a location that is farthest away from the fastening structure. This positioning allows the carriage main body to move more widely around the fulcrum pin than a case where the fulcrum pin is placed close to the fastening structure, providing easier and simpler adjustment of the carriage main body.

The fulcrum pin may be formed integrally with the slide block, which can reduce the number of components with resultant lower management and assembling costs compared with a case where the fulcrum pin and the slide block are configured separately. Forming the positioning pins integrally with the slide block can provide a similar advantage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

FIGS. 1 to 10 illustrate preferred embodiments in which an image scanning apparatus according to the present invention is preferably applied to a multifunctional peripheral including a copier function and a facsimile function. Herein, "front and back", "right and left" and "up and down" respectively follow indications of crossing arrows in FIGS. 2 and 3, and indications represented close to each arrow in the drawings.

Figure 2:
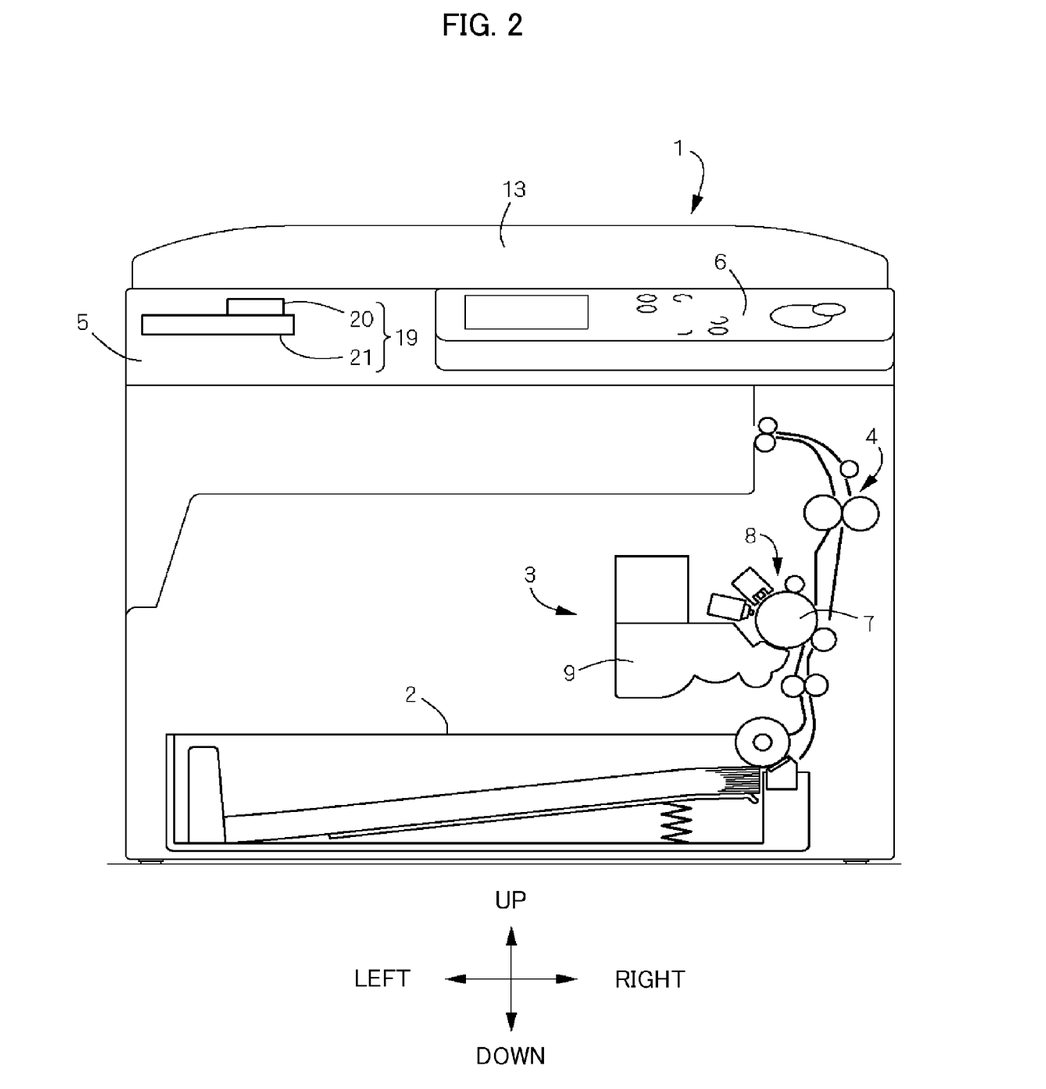
FIG. 2 is a schematic diagram of a multifunctional peripheral to which an image scanning apparatus according to a preferred embodiment of the present invention is applied.

As illustrated in FIG. 2, a multifunctional peripheral 1 includes a paper feeding cassette 2, an image recording portion 3 arranged to transfer a toner image to a piece of recording paper transported from the paper feeding cassette 2, and a fixing portion 4 arranged to fix by applying heat and pressure the toner image onto the recording sheet transported through the image recording portion 3. An image scanning portion (image scanning apparatus) 5 is provided above the image recording portion 3 and the fixing portion 4. On the front portion of the image scanning portion 5, an operation panel including various operation buttons is provided. The image recording portion 3 includes a photoconductive unit 8 including an electrically-charged drum 7, a toner cartridge 9 arranged to supply toner to the photoconductive unit 8 and the like.

Figure 3:
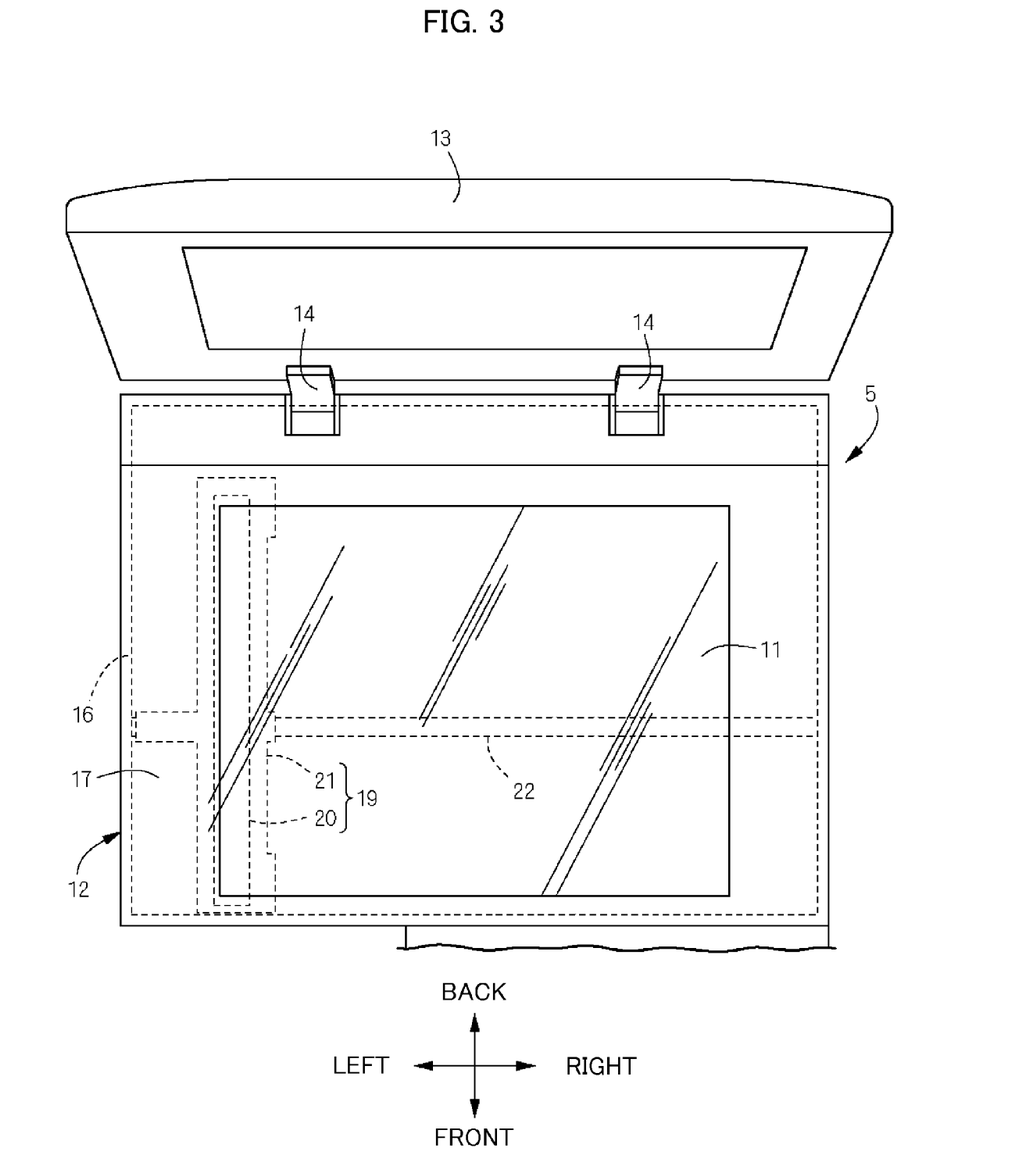
FIG. 3 is a plan view of the image scanning apparatus according to a preferred embodiment of the present invention.
Figure 4:
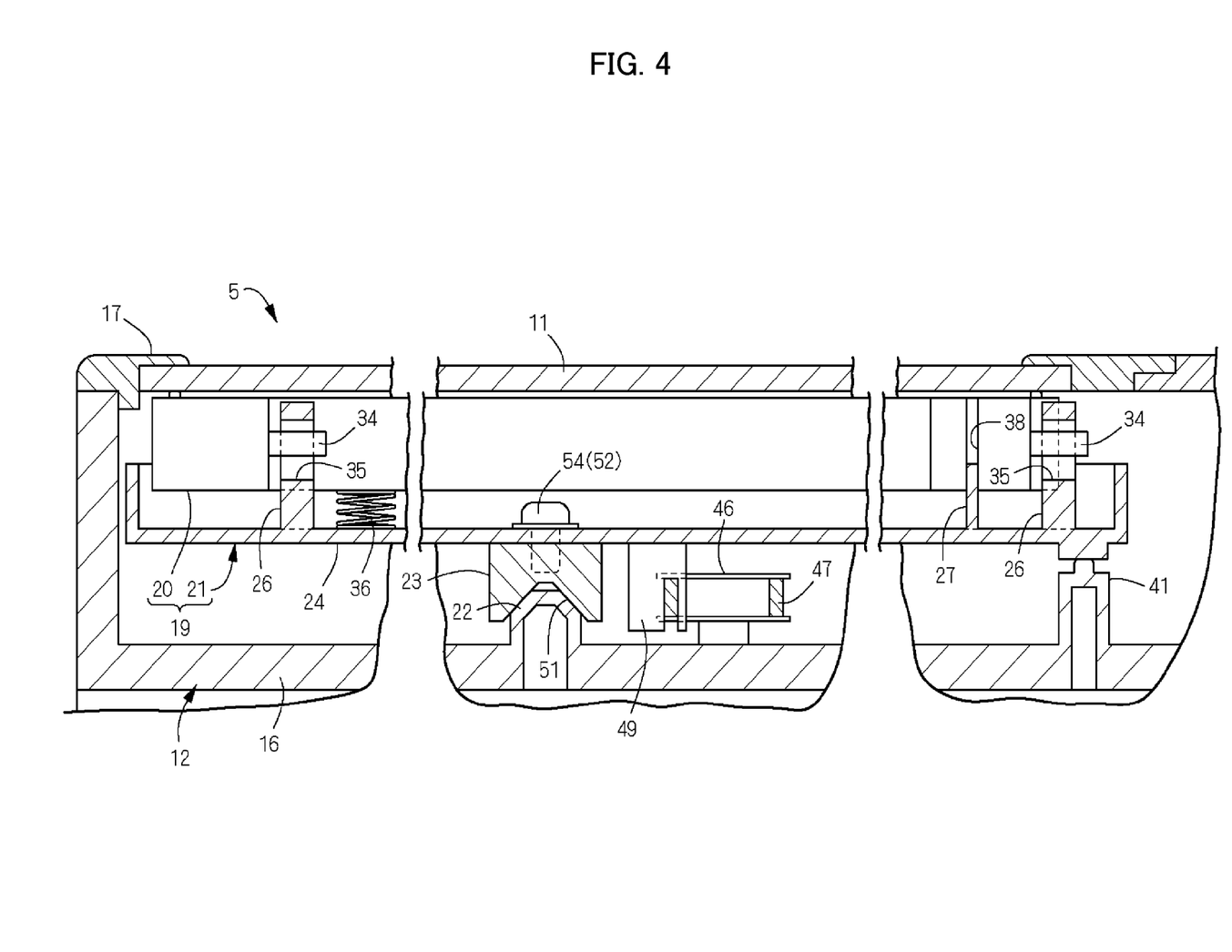
FIG. 4 is a cross-sectional view taken along line B-B of FIG. 5.

As illustrated in FIG. 3, the image scanning portion 5 includes a platen 12 provided with a platen glass 11 arranged to place an original document to be scanned thereon, and a platen cover 13 arranged to press the original document to be in firm contact with the platen glass 11. The platen cover 13 is supported by a pair of left and right hinges 14 provided at a rear end portion of the platen 12 so that the platen cover 13 can be rotated upward and downward. As illustrated in FIG. 4, the platen 12 preferably has a box shape defined by a square-box shape frame 16 with an upward opening, and a frame cover 17 arranged to cover the upward opening of the frame 16. A square opening is located at the middle of the frame cover 17 so that the platen glass 11 is attached to this middle square opening.

Figure 1:
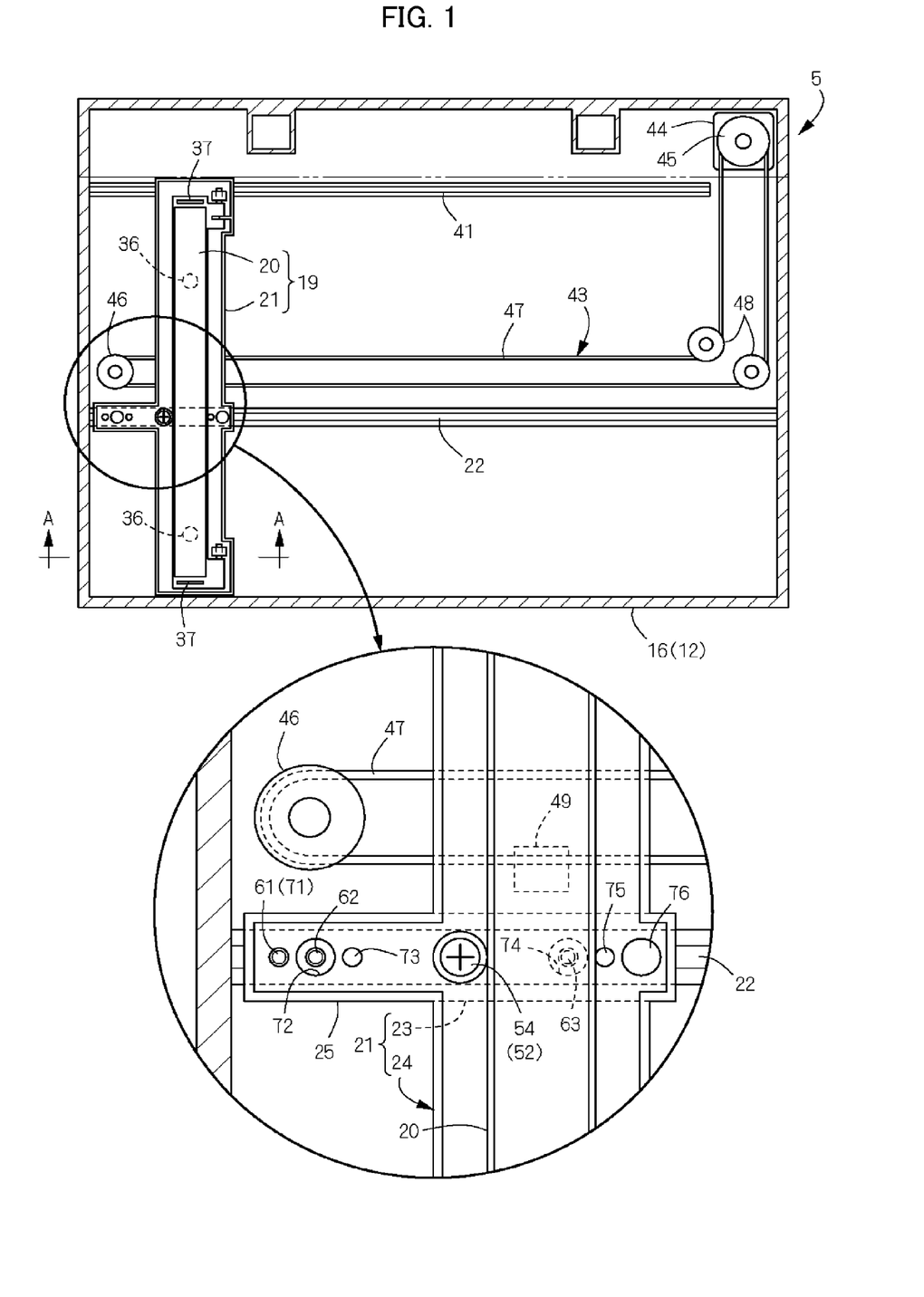
FIG. 1 is a cross-sectional plan view of an image scanning apparatus according to a preferred embodiment of the present invention.

As illustrated in FIG. 1, in the frame 16 of the platen 12, a scanning unit 19 arranged to scan an original document and a guide rail 22 arranged to movably support the scanning unit 19 along the right and left direction (vertical scanning direction) are provided. The scanning unit 19 includes a contact type image sensor (hereinafter simply referred to as "CIS") 20 arranged to scan an original document, and a carriage 21 arranged to support the CIS 20. As illustrated in FIG. 4, the carriage 21 includes a slide block 23 arranged to be guided by the guide rail 22 and a carriage main body 24 arranged to be mounted on the upper surface of the slide block 23. The carriage main body 24 preferably is a resin molded component having a long box shape that is elongated in the front and back direction and has an upward opening, and the CIS 20 is supported by the carriage main body 24. At a portion where the carriage main body 24 faces the guide rail 22, a fastening portion 25 arranged to fasten the carriage main body 24 to the slide block 23 is arranged such that the fastening portion 25 intersects with the left and right walls of the carriage main body 24. At the front and rear ends of the inner bottom surface of the carriage main body 24, guide strips 26 arranged to support the CIS 20 slidably in the vertical direction are integrally formed with the carriage main body 24. At the inner bottom surface of the carriage main body 24, a regulating strip 27 arranged to regulate free movement of the CIS 20 in the front and back direction is also integrally formed with the carriage main body 24.

Figure 5:
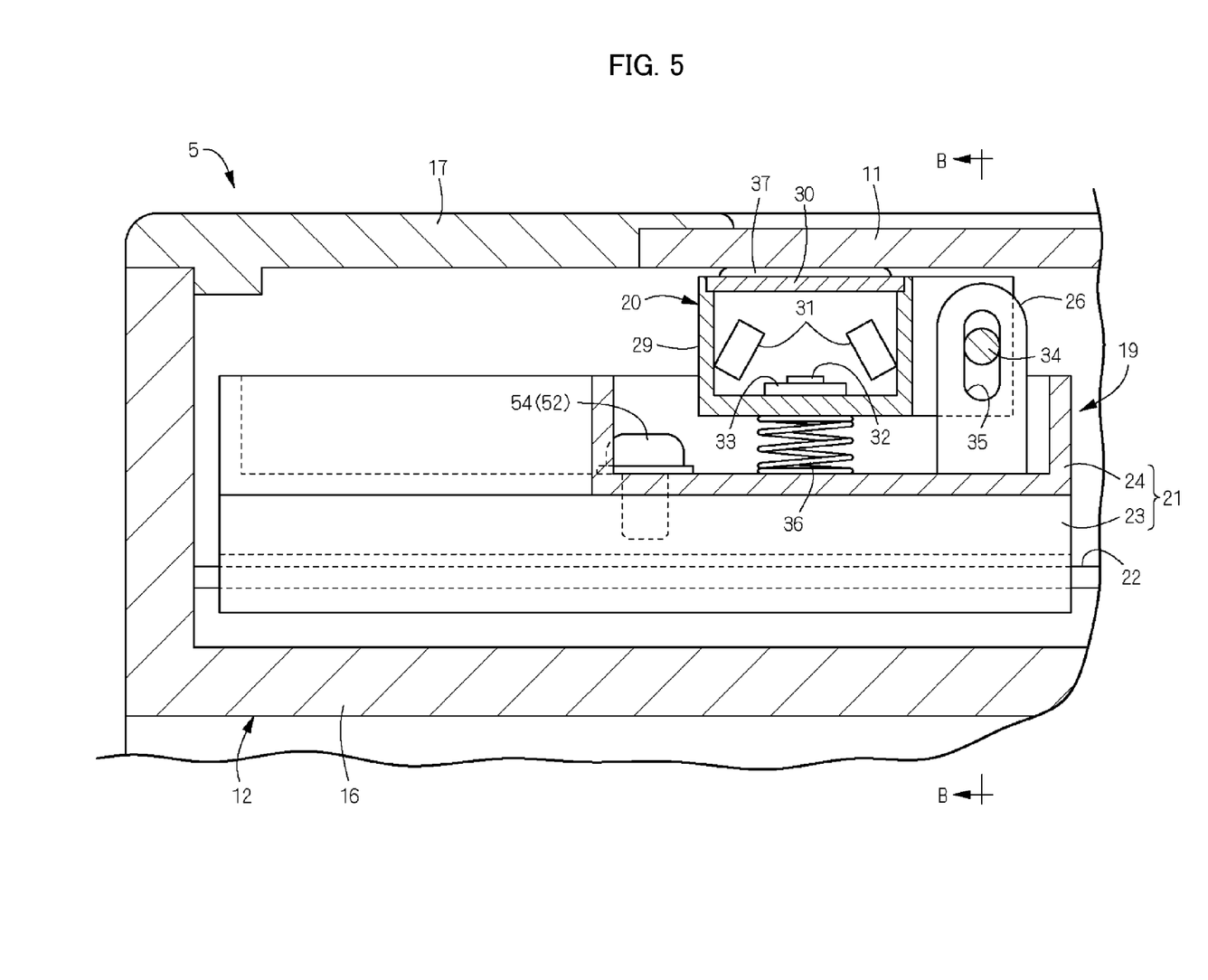
FIG. 5 is a cross-sectional view taken along line A-A of FIG. 1.

As illustrated in FIG. 5, the CIS 20 includes a housing 29 which includes a square-shape box elongated in the front and back direction and has an upward opening, and a transparent protection cover 30 arranged to cover the upper opening of the housing 29. A pair of left and right xenon lamps 31, a lens array 32, and an image sensor circuit board 33 are provided inside the housing 29. Light emitted from the xenon lamp 31 is irradiated toward an original document, and a reflected light is formed into image on the image sensor circuit board 33 through the lens array 32 so that an image of the original document can be scanned to be converted into an electric signal for transmission.

As illustrated in FIG. 4, at both front and rear end portions of the housing 29, slide shafts 34 in the front and back direction are provided, and at each guide strip 26 of the carriage 21, an elongated hole 35 arranged to guide the slide shaft 34 extends in the up and down direction. By guiding the slide shaft 34 with the elongated hole 35 of each guide strip 26, the CIS 20 can be supported to move only in the up and down direction relative to the carriage 21. At two places (front and back) between the under surface of the housing 29 and the inner bottom surface of the carriage main body 24, compression coil type springs 36 that urge the CIS 20 to the platen glass 11 are provided (cf. FIG. 1). At the front and back end portions of the upper surface of the CIS 20, spacers 37 are provided in a protruding manner (cf. FIG. 1). The spacers 37 in close contact with the under surface of the platen glass 11 are arranged to place the focal point of the CIS 20 onto the surface of an original document. A groove 38 is arranged on the housing 29 to accept the regulation strip 27 of the CIS 20 so that the groove 38 and the regulation strip 27 function together to regulate free movement of the CIS 20 in the front and back direction.

As illustrated in FIGS. 1 and 4, the guide rail 22 is positioned in front of the middle in the front and back direction of the carriage 21. The back end portion of the carriage 21 is supported from below with a supporting rail 41 positioned parallel to the guide rail 22. The guide rail 22 and the supporting rail 41 preferably are integrally formed with the frame 16. At the upper surface of the guide rail 22, a trapezoidal guiding portion arranged to guide the slide block 23 is provided.

As illustrated in FIG. 1, a driving structure 43 is provided on the frame 16 of the platen 12 to move the scanning unit 19 along the guide rail 22. The driving structure 43 includes an original drive pulley 45 rotatably fixed to an output shift of a motor 44 within a horizontal surface, a driven pulley 46 arranged to correspond to the original drive pulley 45, and a timing belt 47 wound around both pulleys 45 and 46. The original drive pulley 45 is positioned at the right back corner of the frame 16, and the driven pulley 46 is positioned in back of the left end portion of the guide rail 22. In front of the drive pulley 45, a pair of diverting pulleys 48 are provided. The timing belt 47 positioned between the driven pulley 46 and the diverting pulleys 48 is provided in parallel to the guide rail 22. The timing belt 47 positioned between the original drive pulley 45 and the directing pulleys 48 is provided such that the timing belt 47 is arranged at right angle to the guide rail 22 in the front and back direction. As illustrated in FIG. 4, a belt clamp 49 is provided at the under surface of the carriage main body 24. This connection of the belt clamp 49 to the timing belt 47 allows the scanning unit 19 to move in the right and left direction along the guide rail 22 in accordance with the movement of the timing belt 47.

Figure 6:
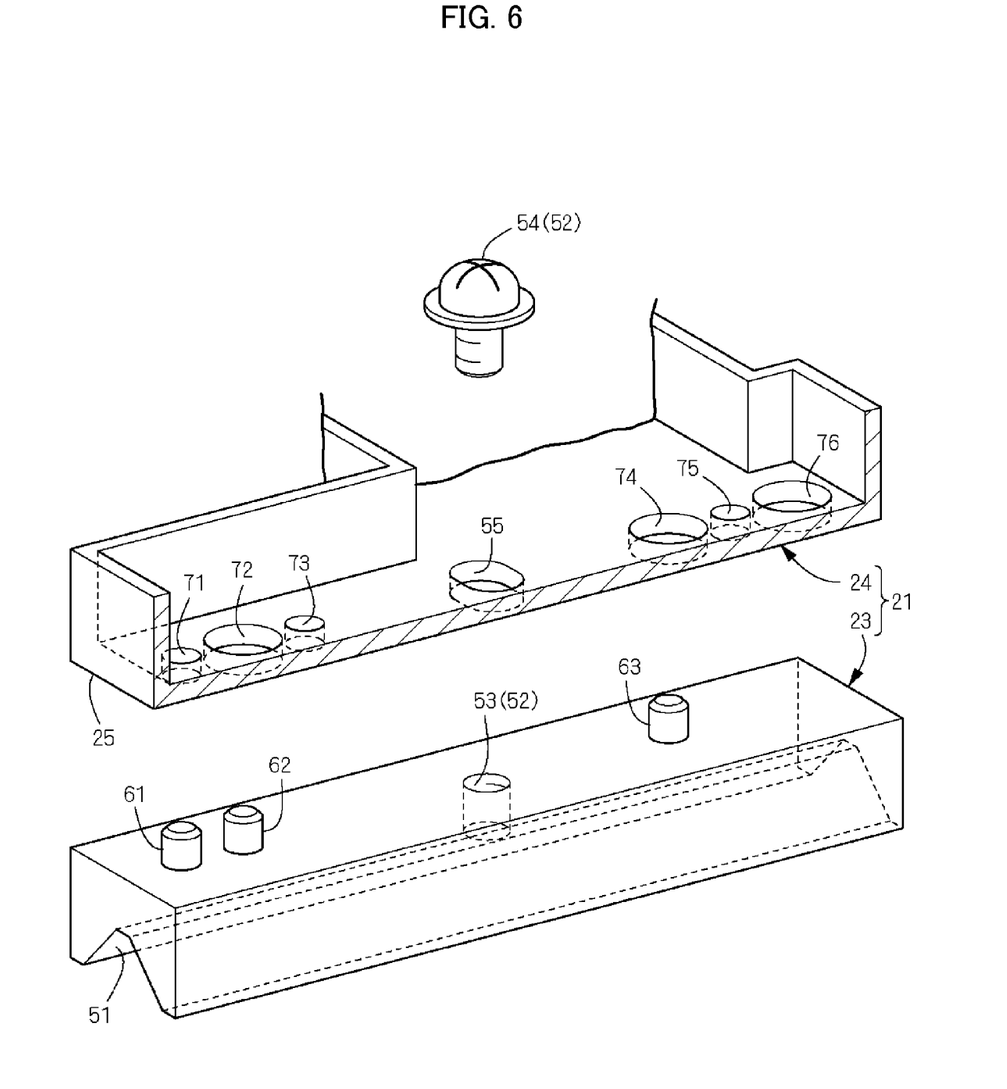
FIG. 6 is a partially-cross-sectional perspective view illustrating a state in which a slide block is separated from a carriage main body.

As illustrated in FIG. 6, the slide block 23 is a block-shaped resin molded component that is elongated in the right and left direction and shaped into a V-shaped block. At the under surface of the slide block 23, a slide surface 51 that is sustained by the guide rail 22 preferably has an inverted V shape. The carriage main body 24 is fixedly mounted onto the slide block 23 at the fastening portion 25 thereof with a fastening structure 52. The fastening structure 52 preferably includes a screw hole 53 that has an upward opening formed at the middle in the right and left direction of the upper surface of the slide block 23, and a screw body 54 that is screwed into the screw hole 53. At the middle in the right and left direction of the under wall of the fastening portion 25, a through hole 55, which includes a long hole in the front and back direction, is formed. By screwing the screw body 54, which has been inserted into the through hole 55, into the screw hole 53, the slide block 23 can be fixed to the carriage main body 24. The reason why the through hole 55 is formed in a long hole in the front and back direction is, as described later, to adjust the angle of the carriage main body 24 relative to the guide rail 22.

At the upper surface of the slide block 23, a fulcrum pin 61, a first positioning pin 62 and a second positioning pin 63 are provided upward along a virtual line running in the right and left direction through the center of the screw hole 53 in order from the left side as illustrated in FIG. 6. In other words, the fulcrum pin 61 and the first positioning pin 62 are positioned on either of the sides locating therebetween and facing the fastening structure 52, and the second positioning pin 63 is positioned on the other of the sides. Each diameter of the pins 61 to 63 is the same, and among three pins 61 to 63, the fulcrum pin 61 is preferably provided at the location farthest away from the fastening structure 52.

At the fastening portion 25 of the carriage main body 24, a fulcrum hole 71, an adjusting hole 72, a positioning hole 73, a adjusting hole 74, a positioning hole 75 and a relief hole 76 are provided in order from the left to correspond to the pins 61 to 63. Among these holes 71 to 76, the fulcrum hole 71, the adjusting hole 72 and the positioning hole 73 are provided in the region left of the through hole 55, and the adjusting hole 74, the positioning hole 75 and the relief hole 76 are provided in the region right of the through hole 55. The fulcrum hole 71 is formed to correspond to the fulcrum pin 61, and the positioning holes 73 and 75 are formed to correspond to the first and the second positioning pins 62 and 63. Each diameter of the adjusting holes 72 and 74 is preferably about twice the diameter of the first and the second positioning holes 62 and 63. Further, the diameter of the relief hole 76 is preferably about twice the diameter of the fulcrum pin 61.

Figure 8:
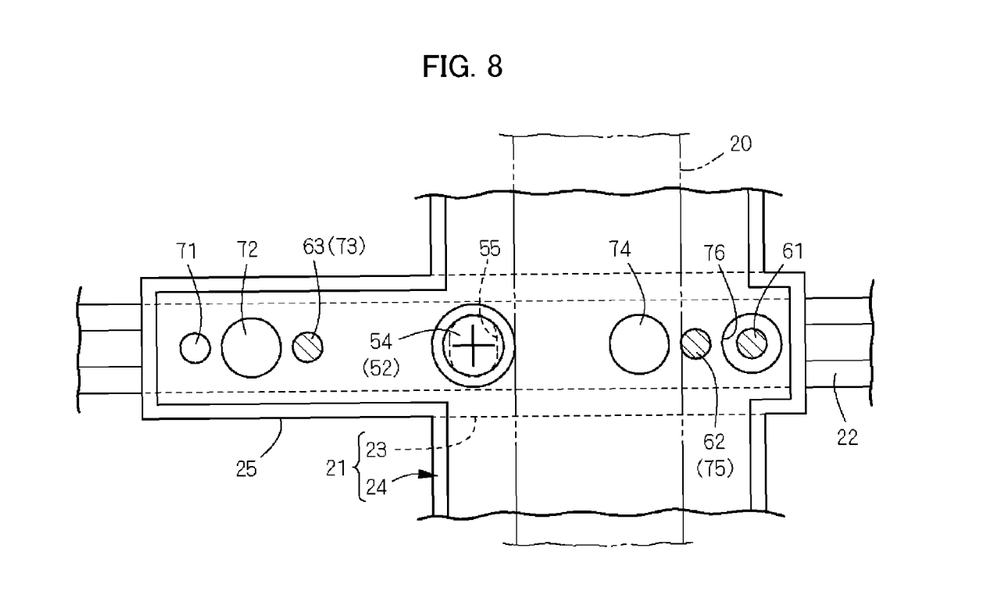
FIG. 8 is a plan view illustrating a principal portion of the slide block in a standard position.
Figure 10:
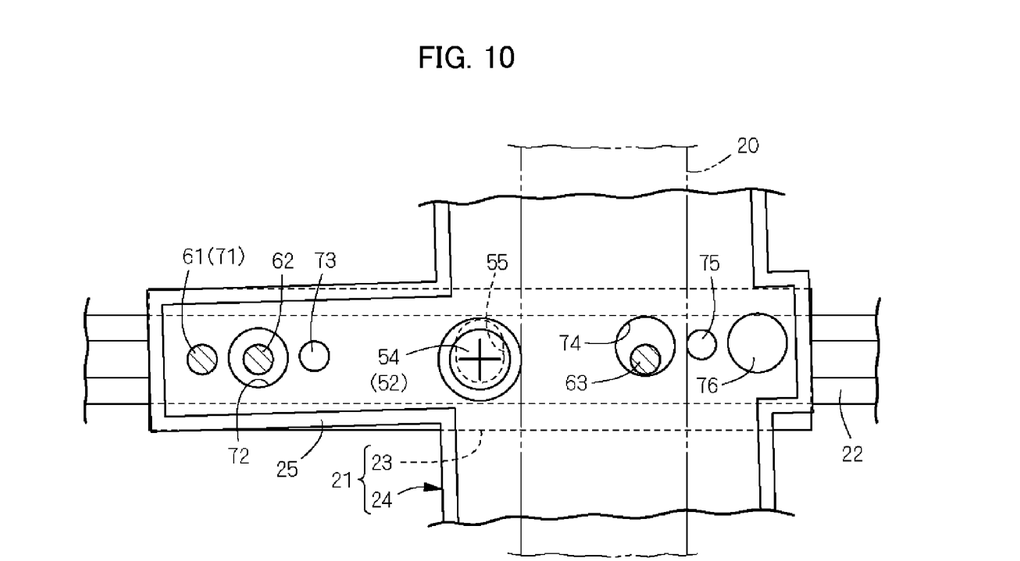
FIG. 10 is a plan view illustrating a principal portion of the slide block in an adjusting position.

The slide block 23 is attached to the guide rail 22 in either the standard position or the adjusting position, which is inverted by 180 degrees from the standard position. As illustrated in FIG. 8, the standard position is a state in which the fulcrum pin 61 is located in the right side of the fastening portion 25. As illustrated in FIG. 10, the adjusting position is a state in which the fulcrum pin 61 is located in the left side of the fastening portion 25.

Figure 7:
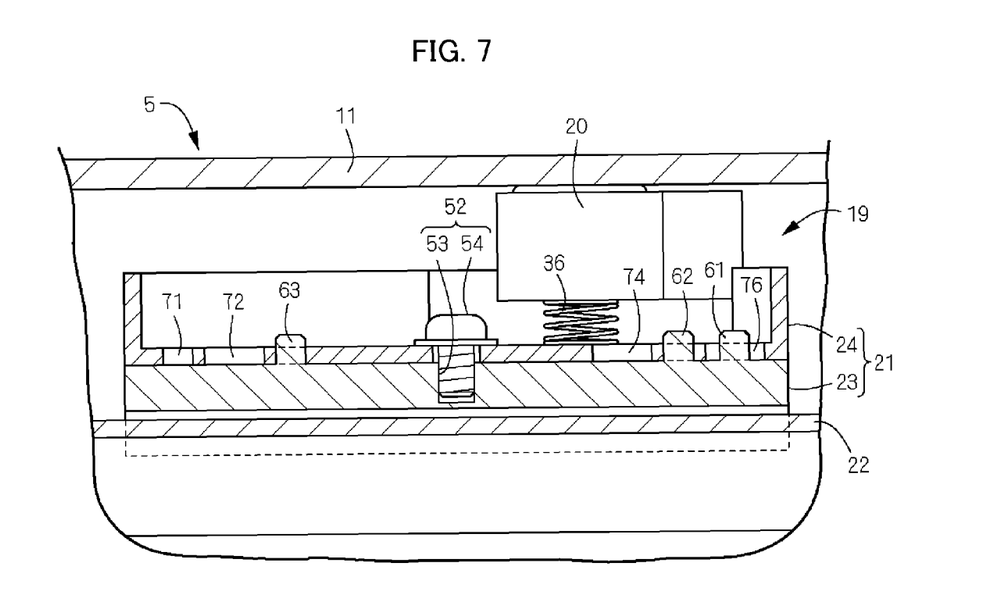
FIG. 7 is a longitudinal front view illustrating a principal portion of the slide block in a standard position.

As illustrated in FIGS. 7 and 8, when the slide block 23 is attached to the guide rail 22 in the standard position and the carriage main body 24 is also mounted onto the slide block 23, each of the pins 61 to 63 is coupled with each of the corresponding holes 71 to 76 in the following way. The second positioning pin 63 is fitted into the positioning hole 73 located in the left side, and the first positioning pin 62 is also fitted into the positioning hole 75 located in the right side, positioning the carriage main body 24. In this state, the fulcrum pin 61 is inserted into the relief hole 76, performing no function at all.

Figure 9:
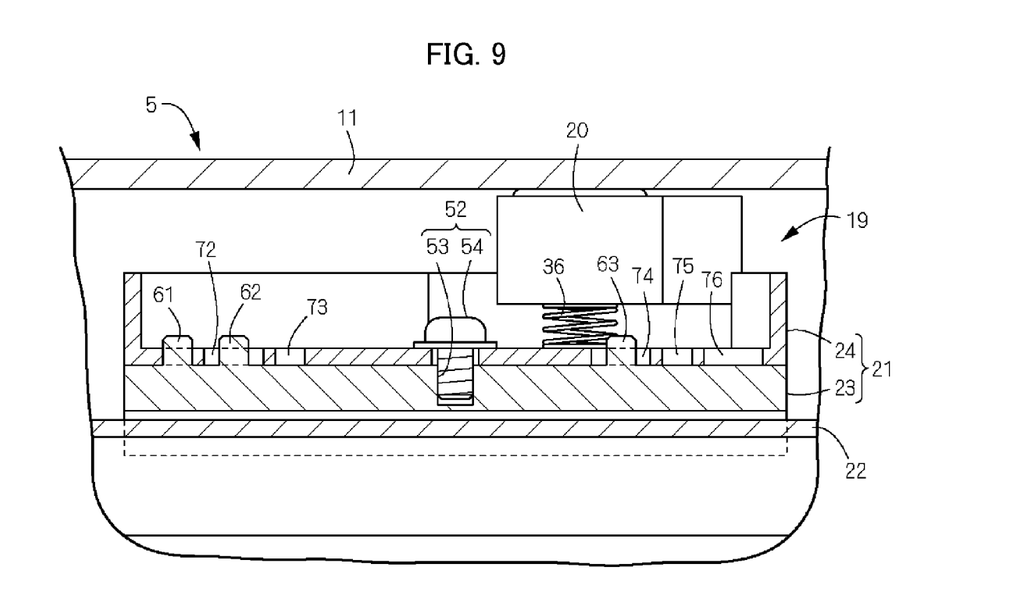
FIG. 9 is a longitudinal front view illustrating a principal portion of the slide block in an adjusting position.

In contrast, as illustrated in FIGS. 9 and 10, when the slide block 23 is in the standard position, the fulcrum pin 61 is fitted into the fulcrum hole 71, and the first and the second positioning pins 62 and 63 are also inserted into the adjusting holes 72 and 74 respectively. In this state, the carriage main body 24 can be swung back and forth within a range of the adjusting holes 72 and 74 upon the fulcrum pin 61 so that the angle of the carriage main body 24 relative to the guide rail 22 can be adjusted. As described above, the angle adjusting mechanism includes the fulcrum pin 61, which is a fulcrum of rotation of the carriage main body 24, the fulcrum hole 71, and the above-mentioned fastening structure 52.

When an image scanning portion 5 is assembled, a test scanning is conducted after the slide block 23 is mounted onto the carriage main body 24 with the slide block 23 in the standard position. As a result of the test scanning, if it is confirmed that a deviation has not occurred in a scanning line of the CIS 20, there is no need to adjust the angle of the carriage main body 24. Consequently, almost all of the image scanning portions 5 are delivered to a next assembling process without adjustment. On the other hand, if it is determined that a scanning line has been deviated from the standard line, the scanning line in question is accurately aligned to the standard line by adjusting the angle of the carriage main body 24 in accordance with the following procedures.

In order to adjust the angle of the carriage main body 24, the platen glass 11 together with the frame cover 17 is removed firstly from the frame 16 to create an open space above the carriage 21 and the CIS 20. Next, a position of the slide block 23 is changed from the standard position to the adjusting position. More specifically, the carriage 21 is separated from the guide rail 22, and the screw body 54 of the fastening structure 52 is removed to detach the carriage main body 24 from the guide block 23. The slide block 23 is inverted by 180 degrees within a horizontal plane and reattached to the carriage main body 24, followed by temporal fixation by screwing the screw body 54 into the screw hole 53. Then, the carriage 21 integrating the slide block 23 and the carriage main body 24 is reattached to the guide rail 22. The operation procedure is not limited to that described above. For example, the screw body 54 may be removed before the carriage 21 is separated from the guide rail 22.

With the screw body 54 being loosened, the angle of the carriage main body 24 can be adjusted by swinging the carriage main body 24 back and forth upon the fulcrum pin 61. After the angle is adjusted, the screw body 54 is screwed completely into the screw hole 53 to fix the carriage main body 24 to the slide block 23. Then, a test scanning of an original document is conducted again to check whether any deviation has occurred in a scanning line. If necessary, the adjusting operation is conducted once again. As described above, when the angle of the carriage main body 24 needs to be adjusted, the angle of the carriage main body 24 can be adjusted by manipulating the screw body 54 without purposely removing the CIS 20 from the carriage 21. Further, as illustrated in FIG. 1, since a manipulation head of the screw body 54 is located outside (left) of the CIS 20 in a plan view, it is possible to directly access the manipulation head of the screw body 54 from the above.

As described above, in the preferred embodiments of the present invention, when any deviation of a scanning line of the CIS 20 is detected in a test scanning, skew correction can be easily conducted by swinging the carriage main body 24 relative to the slide block 23 upon the fulcrum pin 61. The easy correction of skew after completion of assembling the image scanning portion 5 can reduce the manufacturing costs of the image scanning portion 5. In addition, any deviation of a scanning line of the CIS 20 can be resolved by such a simple operation of just rotating the carriage main body 24 with the scanning unit 19 being placed on the guide rail 22.

The slide block 23 is mounted onto the carriage main body 24 with the slide block 23 being in the standard position as its initial state. If a test scanning of an original document is conducted after the image scanning portion 5 is assembled to prove no deviation in a scanning line of the CIS 20 has occurred, the image scanning portion 5 is delivered to a next assembling process. On the other hand, if any deviation of a scanning line is detected through a test scanning, the position of the slide block 23 is changed to the adjusting position to adjust the angle of the carriage main body 24. In other words, in the preferred embodiments of the present invention, the angle of the carriage main body 24 is adjusted only when any deviation of a scanning line is detected through a test scanning after the image scanning portion 5 is assembled, so as to significantly shorten the time required for the adjustment with reduced manufacturing costs of the image scanning apparatus compared with the conventional configuration in which the adjusting operation of the mounting angle is conducted for all of the image scanning apparatuses.

In the preferred embodiments of the present invention, inserting the pins 61 to 63 provided on the upper surface of the slide block 23 into the holes 71 to 76 provided on the lower surface of the carriage main body 24 couples the slide block 23 with the carriage main body 24. Consequently, the slide block 23 can be easily separated from the carriage main body 24 so that the state of the slide block 23 can be easily changed from the standard position to the adjusting position.

In preferred embodiments of the present invention, although a position of the fulcrum pin 61 is not particularly limited, it is preferable that in the preferred embodiments of the present invention the fulcrum pin 61 is positioned at the left end portion of the slide block 23, which portion is located far from the screw hole 53. In this case, compared with a case where a fulcrum pin is positioned close to a screw hole, it becomes easier to adjust the carriage main body 24 since the carriage main body 24 can be swung widely upon the fulcrum pin 61.

Figure 11:
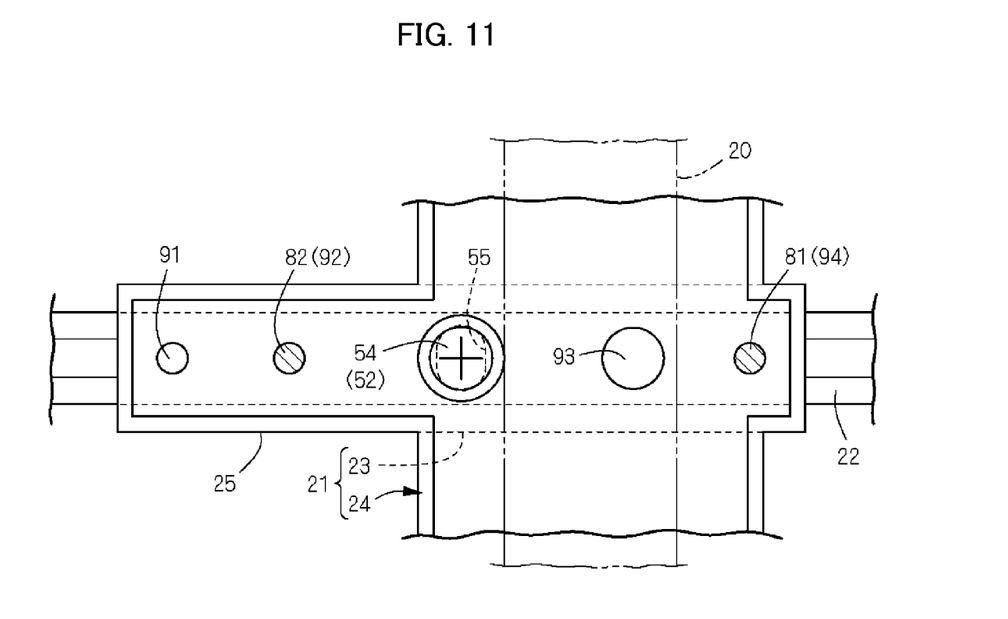
FIG. 11 is a plan view illustrating a principal portion of the slide block in a standard position according to another preferred embodiment of the present invention.
Figure 12:
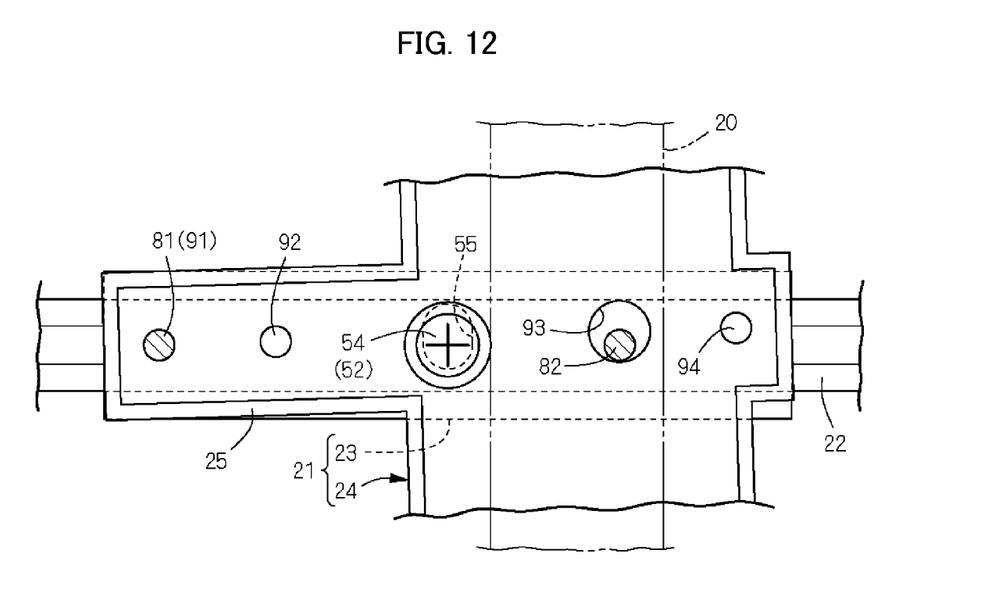
FIG. 12 is a plan view illustrating a principal portion of the slide block in an adjusting position according to another preferred embodiment of the present invention.

In the preferred embodiments described above, when the slide block 23 is in the standard position, the carriage main body 24 is positioned with the first and the second positioning pins 62 and 63. However, as illustrated in FIGS. 11 and 12, the carriage main body 24 can be positioned using a fulcrum pin. In this case, as illustrated in FIG. 11, when the slide block 23 is in the standard position, the positioning pin 82 and the fulcrum pin 81 are fitted into the positioning holes 92 and 94, respectively, to position the carriage main body 24. As illustrated in FIG. 12, when the slide block 23 is in the adjusting position by being inverted by 180 degrees, the fulcrum pin 81 is fitted into the fulcrum hole 91 and the positioning pin 82 are inserted into the adjusting hole 93. Consequently, the angle of the carriage main body 24 can be adjusted by swinging the carriage main body 24 relative to the slide block 23 upon the fulcrum pin 81 within a range of the adjusting hole 93.

When the slide block 23 is in the adjusting position, the fulcrum pin 81 functions as a fulcrum of rotation of the carriage main body 24. When the slide block 23 is in the standard position, the fulcrum pin 81 is fitted into the positioning hole 94 to position the carriage main body 24. In other words, in this preferred embodiment of the present invention, the fulcrum pin also serves as a positioning pin. Since the other portions are the same as explained in the preferred embodiments described above, a description for the other portions will be omitted hereinafter by applying the same number to the same members. Other following preferred embodiments are described likewise.

Figure 13:
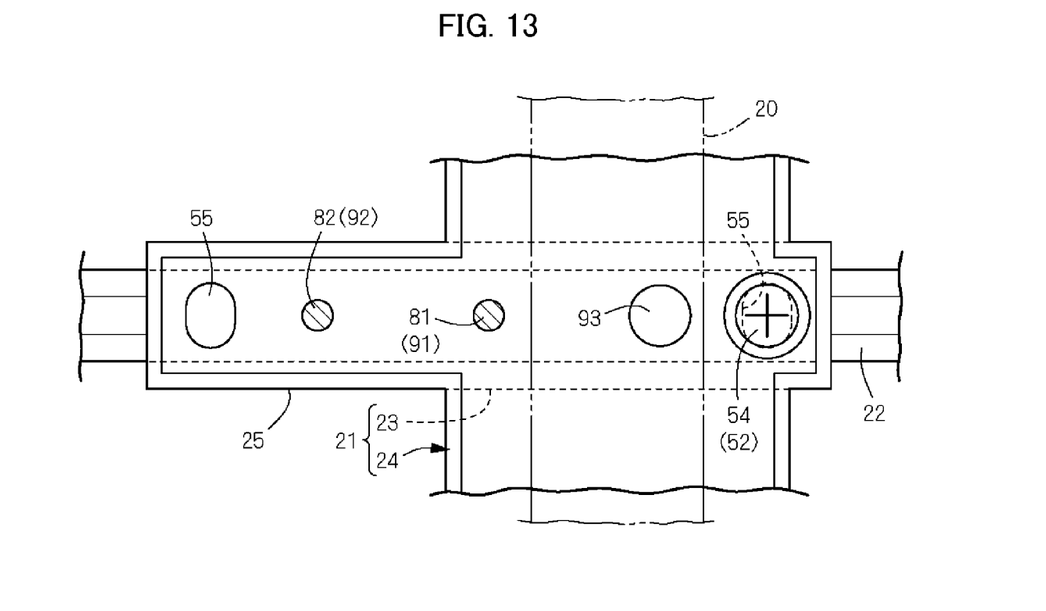
FIG. 13 is a plan view of a principal portion of the slide block in a standard position according to yet another preferred embodiment of the present invention.
Figure 14:
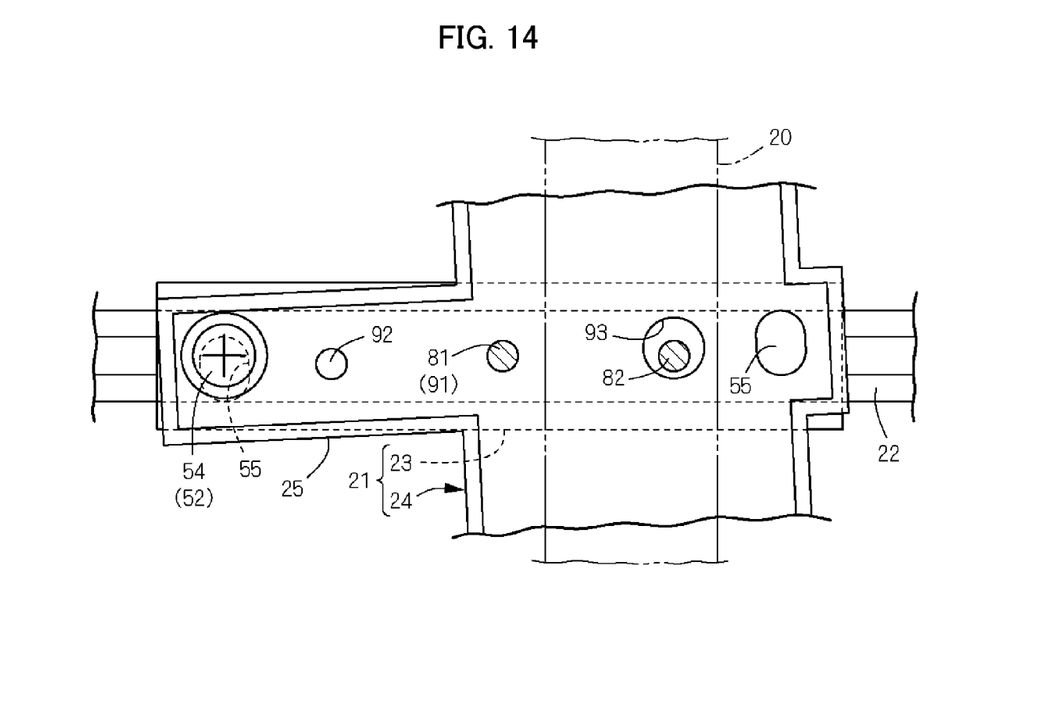
FIG. 14 is a plan view of a principal portion of the slide block in an adjusting position according to yet another preferred embodiment of the present invention.

In each of the preferred embodiments of the present invention, the fulcrum holes 71 and 91 are preferably located at the left end portion of the fastening portion 25 of the carriage main body 24, and the through hole 55 is preferably provided at the middle in the left and right direction. However, as illustrated in FIGS. 13 and 14, it becomes possible to provide the fulcrum hole 91 at the middle in the left and right direction, and provide the through holes 55 at both ends in the left and right direction, respectively. In this case, at the fastening portion 25, one positioning hole 92 is located on the left of the fulcrum hole 91 and one adjusting hole 93 is located on the right of the fulcrum hole 91. Meanwhile, on the slide block 23, the fulcrum pin 81 is located at the middle in the right and left direction, and one positioning pin 82 is located on the side of the fulcrum pin 81. On either end of the right or left of the slide block 23, the screw hole 53 into which the screw body 54 is to be screwed is provided.

When the slide block 23 is in an adjusting position illustrated in FIG. 14, the fulcrum pin 81 is fitted into the fulcrum hole 91 and the positioning pin 82 is inserted into the adjusting hole 93 so that the carriage main body 24 can be rotated upon the fulcrum pin 81. On the other hand, when the slide block 23 is in a standard position illustrated in FIG. 13, the fulcrum pin 81 is fitted into the fulcrum hole 91 and the positioning pin 82 is fitted into the positioning hole 92, to position the carriage main body 24. In other words, in this preferred embodiment of the present invention, the fulcrum pin also serves as a positioning pin, and the fulcrum hole also serves as a positioning hole.

In each of the preferred embodiments of the present invention described above, the pins 61 to 63, 81 and 82 are preferably provided on the slide block 23, and the holes 71 to 76 and 91 to 94 are preferably provided on the carriage main body 24. On the contrary, it is also possible to provide the pins on the carriage main body 24 and to provide the holes on the slide block 23. It is possible to provide three or more positioning pins. Each shape of the adjusting holes 72, 74 and 93 is not limited to a precise circle and can be, for example, an oval or arc. The shape of the through hole 55 is not limited to an elongated shape and may be any other suitable shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image scanning apparatus comprising:
    a platen;
    a scanning unit including an image sensor and a carriage arranged to support the image sensor to scan an original document;
    a guide rail arranged to movably support the scanning unit along a vertical scanning direction; and
    a driving structure arranged to move the scanning unit alone the guide rail; wherein
    the carriage includes a slide block arranged to be guided by the guide rail and a carriage main body arranged to be mounted onto the slide block so that an angle adjustment mechanism is provided between the slide block and the carriage main body to adjust an angle of the carriage main body relative to the guide rail;
    the angle adjusting mechanism includes a fulcrum pin which is provided on either of the slide block or the carriage main body to rotatably support the carriage main body;
    a fastening structure is arranged to fix the carriage main body to the slide block with any angle around the fulcrum pin;
    the slide block is mounted on the guide rail in a standard position or an adjusting position in which the slide block is inverted by 180 degrees;
    when the slide block is in the standard position, the carriage main body is positioned on the slide block with a positioning structure provided between the slide block and the carriage main body; and
    when the slide block is in the adjusting position, the angle of the carriage main body is adjusted by swinging the carriage main body relative to the slide block upon the fulcrum pin.

2. The image scanning apparatus according to claim 1, wherein only one fulcrum pin is provided on either of the slide block or the carriage main body.

3. The image scanning apparatus according to claim 2, wherein on either of the slide block or the carriage main body, the fulcrum pin and the positioning pin are provided, and on the other of the slide block or the carriage main body, a fulcrum hole corresponding to the fulcrum pin, two positioning holes and an adjusting hole corresponding to the positioning pin are provided;
    the fulcrum pin and the positioning pin are arranged such that the fastening structure is located therebetween;
    when the slide block is in the standard position, the positioning pin and the fulcrum pin are fitted into the positioning holes to position the carriage main body; and
    when the slide block is in the adjusting position, the fulcrum pin is fitted into the fulcrum hole and the positioning pin is inserted into the adjusting hole to adjust the angle of the carriage main body within a range of the adjusting hole.

4. The image scanning apparatus according to claim 2, wherein on one of the slide block or the carriage main body, the fulcrum pin and first and second positioning pins are provided, and on the other of the slide block or the carriage main body, a fulcrum hole corresponding to the fulcrum pin, two positioning holes and two adjusting holes corresponding to each of the positioning pins are provided;
    the fulcrum pin and the first positioning pin are provided on one of the sides with the fastening structure located therebetween;
    the second pin is provided on the other one of the sides;
    when the slide block is in the standard position, each of the positioning pins is fitted into the positioning hole to position the carriage main body; and
    when the slide block is in the adjusting position, the fulcrum pin is fitted into the fulcrum hole and each of the positioning pins is inserted into the adjusting hole to adjust the angle of the carriage main body within a range of the adjusting hole.

5. The image scanning apparatus according to claim 3, wherein between the fulcrum pin and the positioning pin, the fulcrum pin is positioned at a location that is farthest away from the fastening structure.

6. The image scanning apparatus according to claim 3, wherein the fulcrum pin is integrally formed with the slide block.

7. The image scanning apparatus according to claim 3, wherein the positioning pin is integrally formed with the slide block.

* * * * *